United States Patent
Chen et al.

(10) Patent No.: US 9,544,467 B2
(45) Date of Patent: Jan. 10, 2017

(54) HALFTONE DATA-BEARING ENCODING SYSTEM AND HALFTONE DATA-BEARING DECODING SYSTEM

(71) Applicant: National Taipei University of Technology, Taipei (TW)

(72) Inventors: Yung-Yao Chen, Taipei (TW); Kai-Wen Chen, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 14/722,621

(22) Filed: May 27, 2015

(65) Prior Publication Data

US 2016/0110635 A1 Apr. 21, 2016

(30) Foreign Application Priority Data

Oct. 20, 2014 (TW) .............................. 103136131 A

(51) Int. Cl.
*G06K 19/06* (2006.01)
*H04N 1/405* (2006.01)

(52) U.S. Cl.
CPC ...... *H04N 1/4051* (2013.01); *G06K 19/06103* (2013.01)

(58) Field of Classification Search
CPC ..................... G06K 19/06009; H04N 1/4051
USPC .................................................. 235/487, 494
See application file for complete search history.

(56) References Cited

U.S. PATENT DOCUMENTS

| | | | |
|---|---|---|---|
| 5,685,652 A * | 11/1997 | Asai ...................... | H04N 1/4051 347/183 |
| 5,832,122 A * | 11/1998 | Shimazaki ........... | H04N 1/4052 358/3.18 |
| 6,829,063 B1 | 12/2004 | Allebach et al. | |
| 6,977,758 B2 | 12/2005 | Lieberman | |
| 7,457,004 B2 * | 11/2008 | Asai ....................... | H04N 1/405 358/3.06 |
| 7,532,365 B2 * | 5/2009 | Asai ..................... | H04N 1/4051 345/596 |
| 7,616,340 B2 * | 11/2009 | Yamazaki .............. | G06K 15/02 347/14 |

(Continued)

FOREIGN PATENT DOCUMENTS

| CN | 100484189 C | 5/2009 |
|---|---|---|
| TW | 355781 | 4/1999 |

(Continued)

OTHER PUBLICATIONS

Bulan et al., "Orientation Modulation for Data Hiding in Clustered-Dot Halftone Prints," IEEE Transactions on Image Processing, 19(8)2070-2084, 2010.

*Primary Examiner* — Paultep Savusdiphol
(74) *Attorney, Agent, or Firm* — Occhiuti & Rohlicek LLP

(57) ABSTRACT

An encoding system converts a grayscale image into an original halftone image according to a predetermined threshold matrix, determines carrier cells from the original halftone image according to reference dot patterns having rotationally asymmetric first-tone patterns, converts the carrier cells into encoded cells according to to-be-embedded codes and rotational states of corresponding asymmetric first-tone patterns, and optimizes non-carrier cells and encoded cells using a direct binary search technique to visually approach the grayscale image.

6 Claims, 8 Drawing Sheets

(56) References Cited

U.S. PATENT DOCUMENTS

| | | | |
|---|---|---|---|
| 7,782,493 B2* | 8/2010 | Asai | H04N 1/4051 345/596 |
| 8,594,453 B2 | 11/2013 | Gaubatz et al. | |
| 2005/0094212 A1* | 5/2005 | Asai | H04N 1/4055 358/3.06 |
| 2005/0264834 A1* | 12/2005 | Asai | H04N 1/4051 358/1.9 |
| 2006/0152767 A1* | 7/2006 | Asai | H04N 1/4051 358/3.23 |
| 2006/0214971 A1* | 9/2006 | Yamazaki | G06K 15/02 347/15 |
| 2015/0356392 A1* | 12/2015 | Ulichney | H04N 1/4051 235/435 |

FOREIGN PATENT DOCUMENTS

| | | |
|---|---|---|
| TW | 200306113 A | 11/2003 |
| TW | 200826685 A | 6/2008 |
| TW | 201012223 A | 3/2010 |

* cited by examiner

HALFTONE DATA-BEARING ENCODING SYSTEM AND HALFTONE DATA-BEARING DECODING SYSTEM

CROSS-REFERENCE TO RELATED APPLICATION

This application claims priority of Taiwanese Application No. 103136131, filed on Oct. 20, 2014.

FIELD

The disclosure relates to data encoding/decoding, and more particularly to an encoding/decoding system for bearing data in a halftone image.

BACKGROUND

Barcode systems have been widely used in various aspects, such as automated logistic management, anti-counterfeit, labels, etc. In one application, a two-dimensional barcode or a QR code may be provided/printed on a poster or digital contents for protecting copyrighted content from illicit and unauthorized use. However, the additional printed barcode or QR code may adversely affect the overall esthetics of posters or digital contents.

Accordingly, it is a goal in the industry to embed information/data (e.g., anti-counterfeit data), into valuable printed matter (e.g., trademarks, pictures, etc.), such that the information/data is inconspicuously integrated in the printed matter without affecting the overall esthetics. Referring to FIG. 1, U.S. Pat. No. 8,594,453 discloses a method for bearing data in a halftone image in which a dot pattern of a cell is shown to consist of a plurality of pixels. By virtue of four shifted versions 502, 504, 506, 508 of the cell respectively representing four binary codes, such as 00, 01, 10 and 11, information may be embedded in the halftone image using binary codes, thereby preventing additional printing of barcodes or QR codes from affecting the overall esthetics. However, such an encoding method of moving the dots does not belong to traditional halftoning technique, and may have adverse effects on visual quality of the halftone image.

In addition, a conventional direct binary search (DBS) may be used to optimize visual quality of the halftone image. Referring to FIG. 2, the DBS iteratively/recursively performs on a central pixel 100 trials of swapping operations with eight neighboring pixels or toggling operation (black-white conversion, or vice versa), and obtains a minimum perceptual error using a human visual system based model that simulates human vision, thereby obtaining a halftone image that may achieve the highest visual similarity to the original grayscale image.

Another conventional halftoning technique is proposed in O. Bulan, G. Sharma, and V. Monga, "Orientation Modulation for Data Hiding in Clustered-Dot Halftone Prints," *IEEE Transactions on Image Processing*, vol. 19, no. 8, pp. 2070-2084, August 2010 (hereinafter, Bulan reference). The Bulan reference performs screening with a modified Pellar threshold function to generate an original halftone image. The modified Pellar threshold function increases ellipticity of the halftone dot, thereby facilitating encoding by rotation of the halftone dot. However, referring to FIG. 5 of the Bulan reference, the dot orientation is not noticeably distinguishable in highlights, midtones (i.e., at gray-levels close to 50% area coverage) and shadows, and is unable to perform encoding by rotation of the halftone dot. For example, the halftone dots of the Bulan reference form a checkboard-like pattern, which are rotationally symmetric and unsuitable for encoding by rotation of the halftone dot.

FIGS. 8 and 9 respectively and exemplarily show a clustered-dot threshold matrix 81 and a dispersed-dot threshold matrix 91 which are two of threshold matrix that are the frequently used for screening, and their corresponding dot growth orders 82, 92. When a grayscale image is converted to a halftone image by the clustered-dot threshold matrix which is robust to printing artifacts that come from dot gain effects, the dots tend to cluster together. When a grayscale image is converted to a halftone image by the dispersed-dot threshold matrix, the dots tend to disperse.

SUMMARY

Therefore, an object of the disclosure is to provide an encoding system that may convert a grayscale image into a data-bearing halftone image with DBS being implemented, thereby achieving optimized image quality.

According to one aspect of the disclosure, the encoding system includes a halftoning module, a selecting module, an encoding module, a non-carrier cell optimizing module and an encoded cell optimizing module.

The halftoning module is configured to convert an original grayscale image into an original halftone image by screening the grayscale image using a predetermined threshold matrix that includes a plurality of grayscale threshold values. The original halftone image consists of first-tone dots and second-tone dots and has a plurality of image cells each corresponding to the predetermined threshold matrix in size.

The selecting module is configured to select at least one of the image cells to be a carrier cell according to a set of reference dot patterns that corresponds with the predetermined threshold matrix. The carrier cell has a dot pattern identical to one of the reference dot patterns that has an asymmetric first-tone pattern consisting of a plurality of first-tone dots and being rotationally asymmetric.

The encoding module is configured to convert the carrier cell into an encoded cell according to a to-be-embedded code and at least two different rotational states of the asymmetric first-tone pattern that are respectively defined to represent different codes.

The non-carrier cell optimizing module is configured to optimize at least one non-carrier cell which is one of the image cells not determined to be the carrier cell by performing a direct binary search on each pixel of said at least one non-carrier cell until a minimum error that from portion of the original grayscale image that corresponds to said at least one non-carrier cell has been determined.

The encoded cell optimizing module is configured to optimize the encoded cell by performing trials of a variety of displacements in a manner of the direct binary search on a first-tone pattern of the encoded cell that consists of a plurality of first-tone dots until a minimum error from a portion of the original grayscale image that corresponds to the encoded cell has been determined.

According to another aspect of the disclosure, a decoding system is provided for obtaining data from a data-bearing halftone image encoded by the encoding system of this disclosure. The decoding system includes a database, a selecting module and a decoding module.

The database that stores therein an original grayscale image corresponding to the data-bearing halftone image, a predetermined threshold matrix that includes a plurality of grayscale threshold values, and a set of reference dot patterns that corresponds with the predetermined threshold matrix. At least one of the reference dot patterns has an asymmetric first-tone pattern consisting of a plurality of first-tone dots and being rotationally asymmetric, and at least two different rotational states of the asymmetric first-tone pattern are respectively defined to represent different codes.

The selecting module is configured to convert the grayscale image into an original halftone image by screening the original grayscale image using the predetermined threshold matrix. The original halftone image consists of a plurality of first-tone dots and a plurality of second-tone dots and has a plurality of image cells each corresponding to the predetermined threshold matrix in size.

The selecting module is further configured to select at least one of the image cells to be a carrier cell according to said at least one of the reference dot patterns that has the asymmetric first-tone pattern, and to determine a data-bearing cell from the data-bearing halftone image according to the carrier cell thus determined.

The decoding module is configured to determine one of the rotational states of the asymmetric first-tone pattern that corresponds to a dot pattern of the data-bearing cell, and to determine a code represented by said one of the rotational states thus determined.

According to yet another aspect of the disclosure, a method for generating a data-bearing image from an original grayscale image is provided to be implemented using the encoding system of the present disclosure.

The method includes the steps of:

converting the original grayscale image into an original halftone image by screening the original grayscale image using a predetermined threshold matrix that includes a plurality of grayscale threshold values, the original halftone image consisting of first-tone dots and second-tone dots and having a plurality of image cells each corresponding to the predetermined threshold matrix in size;

selecting at least one of the image cells to be a carrier cell according to a set of reference dot patterns that corresponds with the predetermined threshold matrix, the carrier cell having a dot pattern identical to one of the reference dot patterns that has an asymmetric first-tone pattern consisting of a plurality of first-tone dots and being rotationally asymmetric;

converting the carrier cell into an encoded cell according to a to-be-embedded code and at least two different rotational states of the asymmetric first-tone pattern that are respectively defined to represent different codes;

optimizing at least one non-carrier cell which is one of the image cells not determined to be the carrier cell by performing a direct binary search on each pixel of said at least one non-carrier cell until a minimum error from a portion of the grayscale image that corresponds to said at least one non-carrier cell has been determined; and optimizing the encoded cell by performing trials of a variety of displacements in a manner of the direct binary search on a first-tone pattern of the encoded cell that consists of a plurality of first-tone dots until a minimum error from a portion of the grayscale image that corresponds to the encoded cell has been determined.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
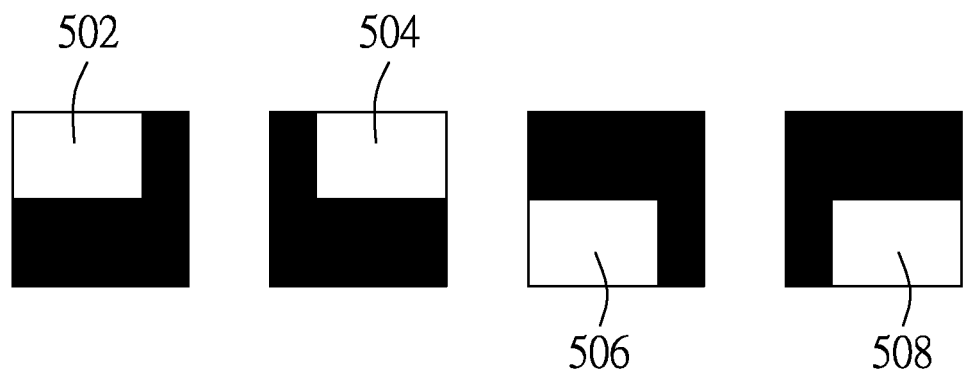
FIG. 1 is a schematic diagram illustrating four shifted versions of a cell of a halftone image using a conventional data-bearing encoding method.
Figure 2:
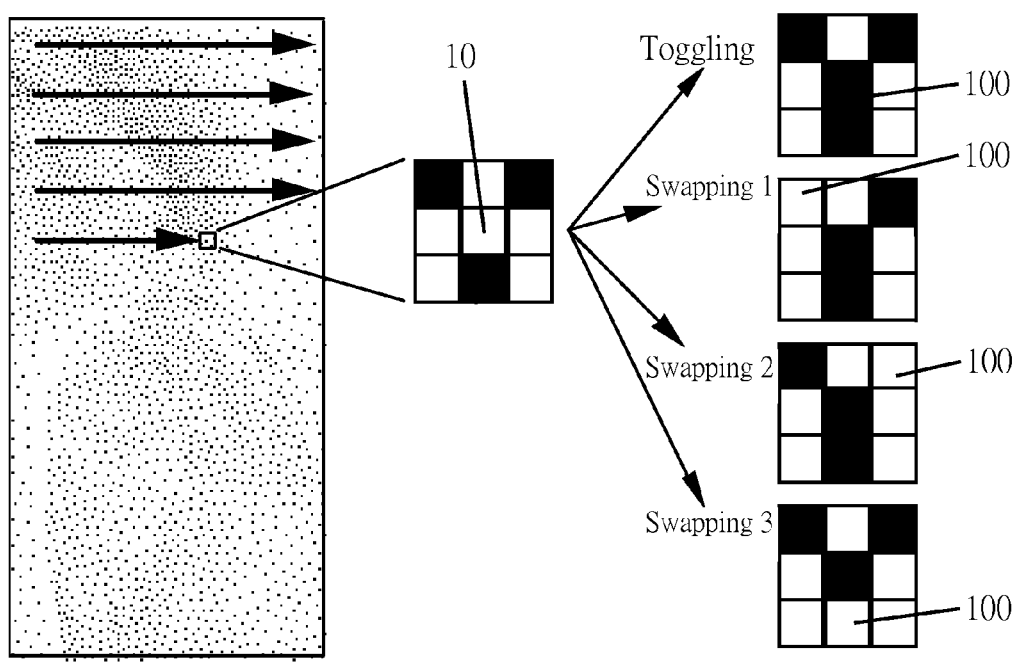
FIG. 2 is a schematic diagram illustrating application of a direct binary search to a cell of a halftone image.
Figure 3:
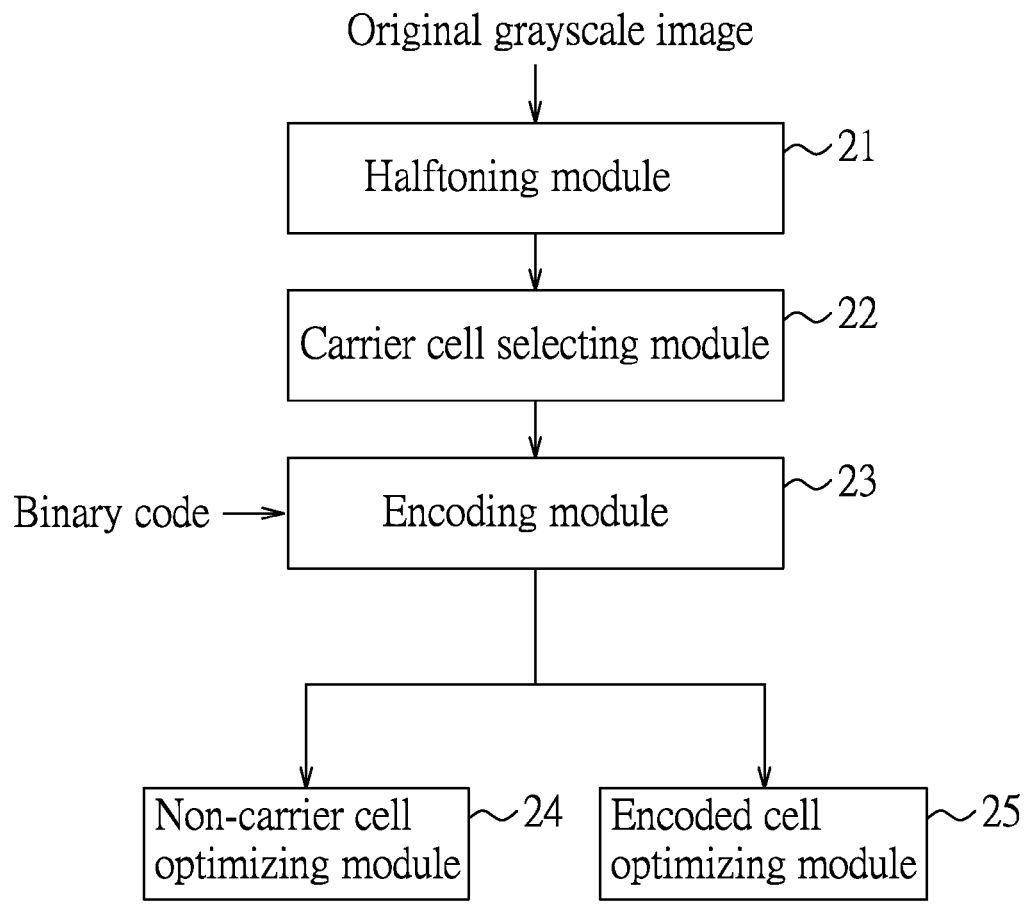
FIG. 3 is a block diagram illustrating an embodiment of an encoding system according to the present disclosure.

Before the disclosure is described in greater detail, it should be noted that like elements are denoted by the same reference numerals throughout the disclosure.

Referring to FIGS. 3 to 6, the embodiment of an encoding system of this disclosure is configured to generate a data-bearing halftone image according to an inputted original grayscale image 10, and includes a halftoning module 21, a carrier cell selecting module 22, an encoding module 23, a non-carrier cell optimizing module 24 and an encoded cell optimizing module 25. In this embodiment, the original grayscale image 10 is exemplified using a portion of a to-be-encoded image and has 8×8 pixels. The halftoning module 21 converts the original grayscale image 10 into an original halftone image 11 according to a predetermined square threshold matrix 26, which is a clustered-dot threshold matrix.

In detail, the square threshold matrix 26 of this embodiment is a 4×4 clustered-dot screen having a screen tile vector set that consists of two two-dimensional vectors [0,4], [4,0] and has 4×4 grayscale threshold values. The halftoning module 21 divides the original grayscale image 10 into four grayscale cells 101 each having 4×4 pixels, and compares the grayscale cells 101 with the threshold matrix 26 one by one along a direction from left to right and from top to bottom. For each grayscale cell 101, the halftoning module 21 compares each pixel thereof with one of the threshold values at a corresponding location of the threshold matrix 26, followed by outputting "1" to represent a first-tone dot when the grayscale of the pixel is greater than or equal to the corresponding grayscale threshold value, and outputting "0" to represent a second-tone dot when the grayscale of the pixel is smaller than the corresponding grayscale threshold value. In this embodiment, the first-tone dots are exemplified as white dots, and the second-tone dots are exemplified as black dots, but the present disclosure is not limited thereto. Thus, the original grayscale image 10 is converted into the original halftone image 11 consisting of first-tone and second-tone dots, and having a plurality of image cells 111 each having a corresponding dot pattern. Each image cell 111 is equal in size (i.e., number of pixels) with each grayscale cell 101.

Figure 4:
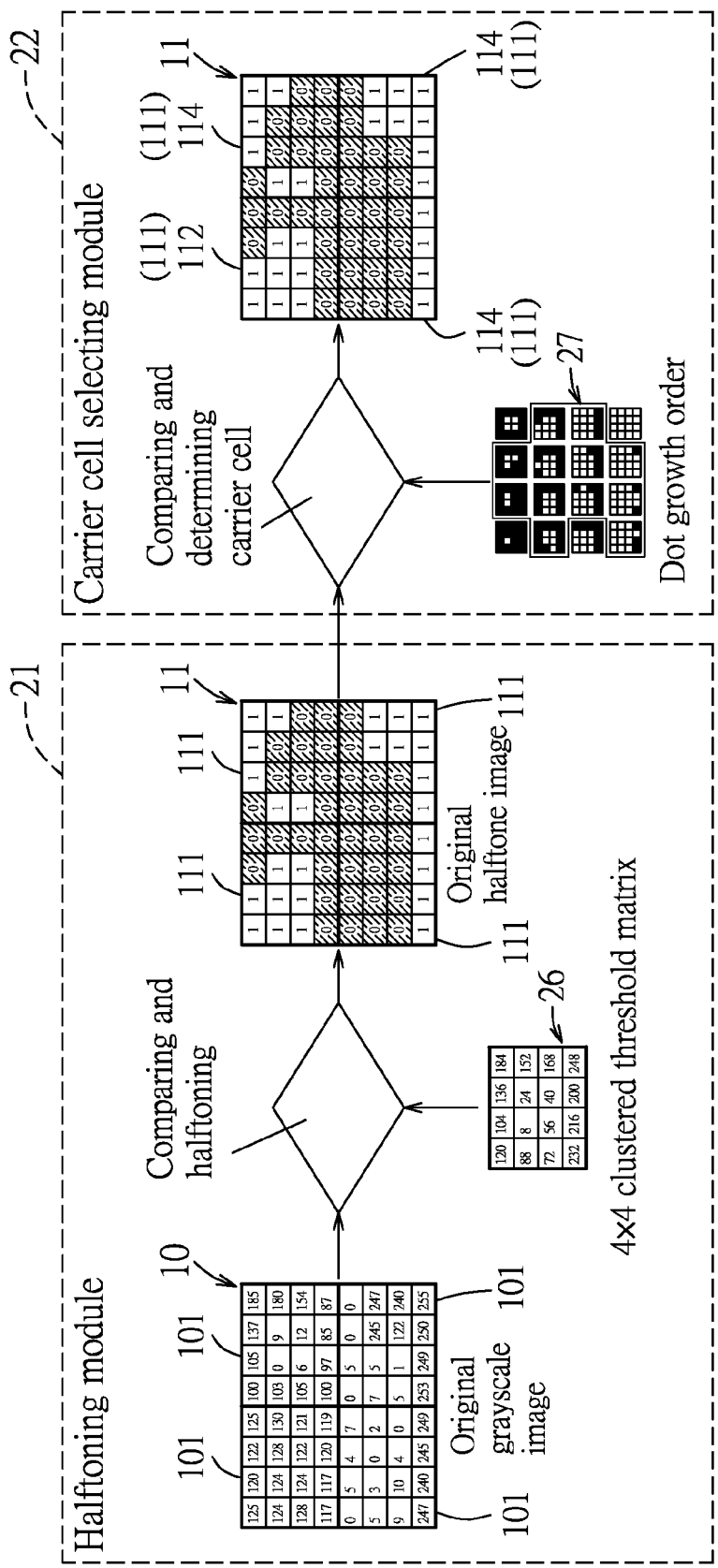
FIG. 4 is a schematic diagram illustrating a process flow of the embodiment of the encoding system to convert an original grayscale image into a halftone image, and to determine a carrier cell of the halftone image.

In this embodiment, the square threshold matrix 26 corresponds to a set of reference dot patterns, called a dot growth order 27. In detail, the dot growth order corresponds to distribution of the grayscale threshold values of the square threshold matrix 26. Referring to FIG. 4, the dot growth order 27 has sixteen different reference dot patterns, and is derived from the square threshold matrix 26 with reference to respective gray scales, using a screening process as described in the following. In the screening process, a series of 4*4 screen matrices each having all elements assigned with grayscales within a predetermined range of the overall grayscales 0-255 are used sequentially for screening the square threshold matrix 26. For the screen matrix with all elements assigned with a grayscales within the range of 0 to 7, all outputted values from the square threshold matrix 26 are '0', and a resulting dot pattern consists entirely of the second-tone dots (black dots). This particular dot pattern is discarded. For the screen matrix with all elements assigned with grayscales falling within the range of 8 to 23, all but one outputted values from the square threshold matrix 26 are '0', and a resulting dot pattern, i.e., a $1^{st}$ reference dot pattern has one first-tone dot (white dot) (corresponding in location with the element '8' of the square threshold matrix 26). The screening process is iterated for other fourteen screen matrices with the elements assigned grayscales within predetermined non-overlapping ranges of 24 to 39, . . . , and 248 to 255, and up to sixteen different reference dot patterns will be generated in the screening process. Accordingly, a $2^{nd}$ reference dot pattern has a first-tone pattern consisting of two first-tone dots, a $3^{rd}$ reference dot pattern has a first-tone pattern consisting of three first-tone dots, . . . , and a $16^{th}$ reference dot pattern has a first-tone pattern consisting of sixteen first-tone dots (i.e., all of the dots are white dots). When the original halftone image 11 is converted from an ordinary grayscale image using such an algorithm, most of the halftone cells 111 may have a dot pattern identical to one of the reference dot patterns. It is noted that different square threshold matrices may correspond to different sets of reference dot patterns.

In this embodiment, the encoding module 23 encodes data according to different rotational states of each reference first-tone pattern that are defined to respectively represent different codes. In one example, the rotational states of one reference first-tone pattern may be obtained by rotating the first-tone pattern of the $6^{th}$ reference dot pattern (see FIG. 4, the reference dot pattern having six white dots) clockwise or counterclockwise respectively by 0° (i.e., no rotation) and 90° to respectively represent different codes, such as binary "0" and "1". In another example, the rotational states of one reference first-tone pattern may be obtained by rotating the first-tone pattern of the $5^{th}$ reference dot pattern (see FIG. 4, the reference dot pattern having five white dots) clockwise or counterclockwise respectively by 0°, 90°, 180° and 270° to respectively represent different codes, such as binary "00", "01", "10" and "11". It would be appreciated that the rotational state may refer to a corresponding rotating instruction associated with the corresponding reference first-tone pattern, e.g., to rotate clockwise by 90°. Since the encoding scheme implemented in this embodiment is based on different rotational states of the reference first-tone patterns, the reference first-tone patterns suitable for the encoding must be rotationally asymmetric (hereinafter, asymmetric first-tone pattern), and thus only those reference dot patterns having asymmetric first-tone patterns are used to determine, from the image cells 111, carrier cells 112 that are suitable to be encoded to bear data (e.g., binary codes), as will be made clear in the subsequent paragraph.

The carrier cell selecting module 22 selects an image cell 111 to be the carrier cell 112 according to the reference dot patterns having the asymmetric first-tone patterns (e.g., the $2^{nd}$, $3^{rd}$, $5^{th}$, $6^{th}$, $7^{th}$, $8^{th}$, $10^{th}$, $11^{th}$, $12^{th}$, $13^{th}$, $14^{th}$ and $15^{th}$ reference dot patterns shown in FIG. 4, which are encircled together) that correspond to the square threshold matrix 26. In detail, the carrier cell selecting module 22 compares a dot pattern of each of the image cells 111 with the reference dot patterns having the asymmetric first-tone patterns, and selects one of the image cells 111 that has the dot pattern identical to one of the reference dot patterns having the asymmetric first-tone patterns to be the carrier cell 112. As an example, in FIG. 4, the left-top image cell 111 of the original halftone image 11 has the dot pattern identical to the $8^{th}$ reference dot pattern, and is determined to be the carrier cell 112.

Figure 5:
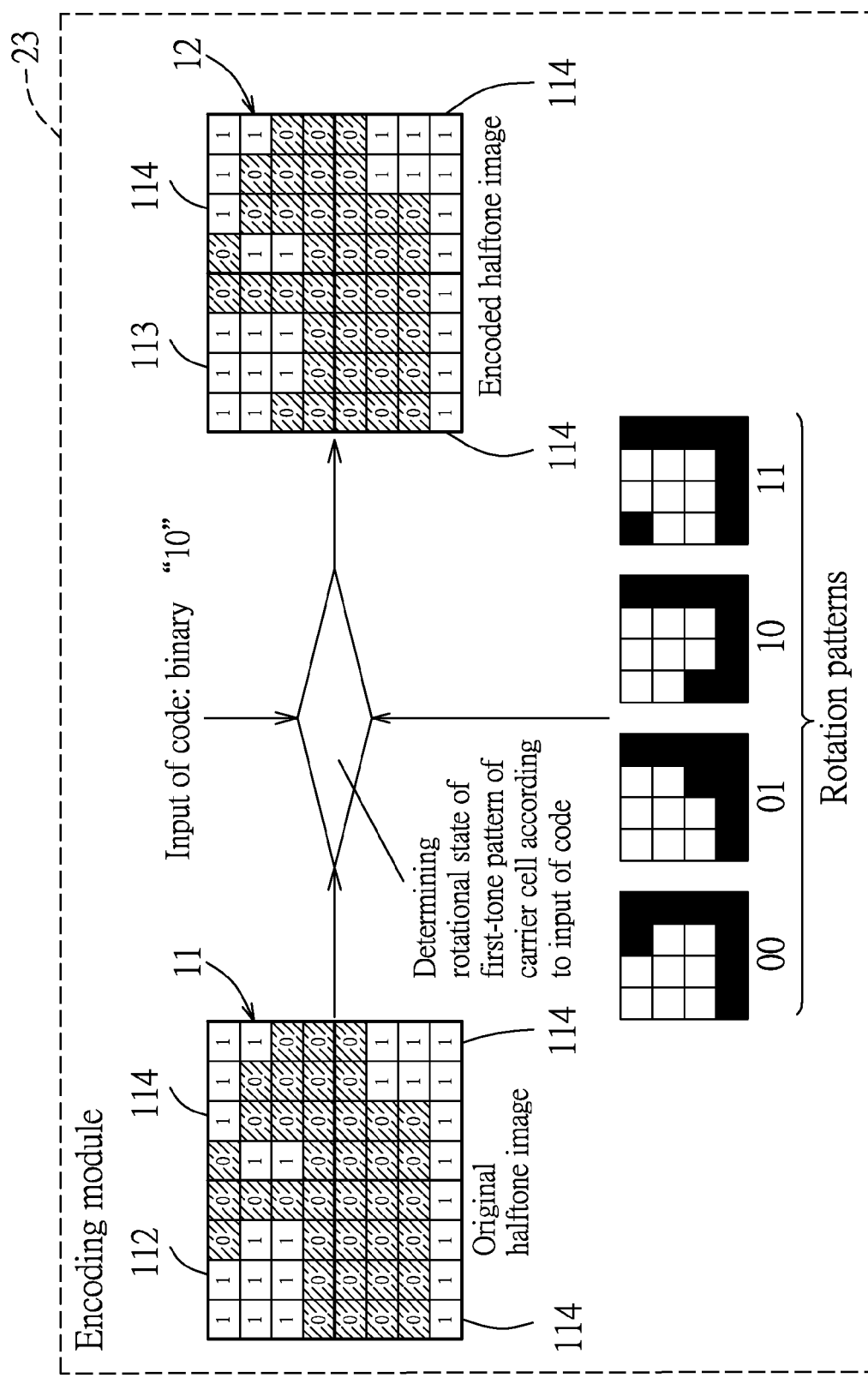
FIG. 5 is a schematic diagram illustrating a process flow of the embodiment of the encoding system to embed binary codes into the halftone image.

Referring to FIG. 5, the encoding module 23 determines, according to a to-be-embedded code, ex.: binary "10", a rotational state of one of the reference (asymmetric) first-tone patterns, which is identical to the first-tone pattern of the carrier cell 112 (or, the first-tone pattern of the $8^{th}$ reference dot pattern), that represents the binary "10" from a predetermined set of four rotational states of said one of the reference first-tone patterns, and processes the carrier cell 112 based on the determined rotational state of said one of the reference first-tone patterns to thereby convert the carrier cell 112 into an encoded cell 113. In this embodiment, the encoding module 23 has, for each reference first-tone pattern, multiple rotation patterns that are identical in size to the image cells 111 and that respectively represent different rotational states for the reference first-tone pattern, selects one of the rotation patterns that corresponds to the dot pattern of the carrier cell 112 and that represents the to-be-embedded code, and replaces the dot pattern of the carrier cell 112 with the selected rotation pattern, thereby converting the carrier cell 112 into the encoded cell 113.

In this embodiment, since essentially, the encoding only results in rotation of the first-tone pattern of each carrier cell 112 of the original halftone image 11, with the number of the first-tone dots (white dots) in the corresponding encoded cell 113 being unaltered from that of the carrier cell 112, image quality of an encoded halftone image 12 thus obtained may be maintained.

Figure 6:
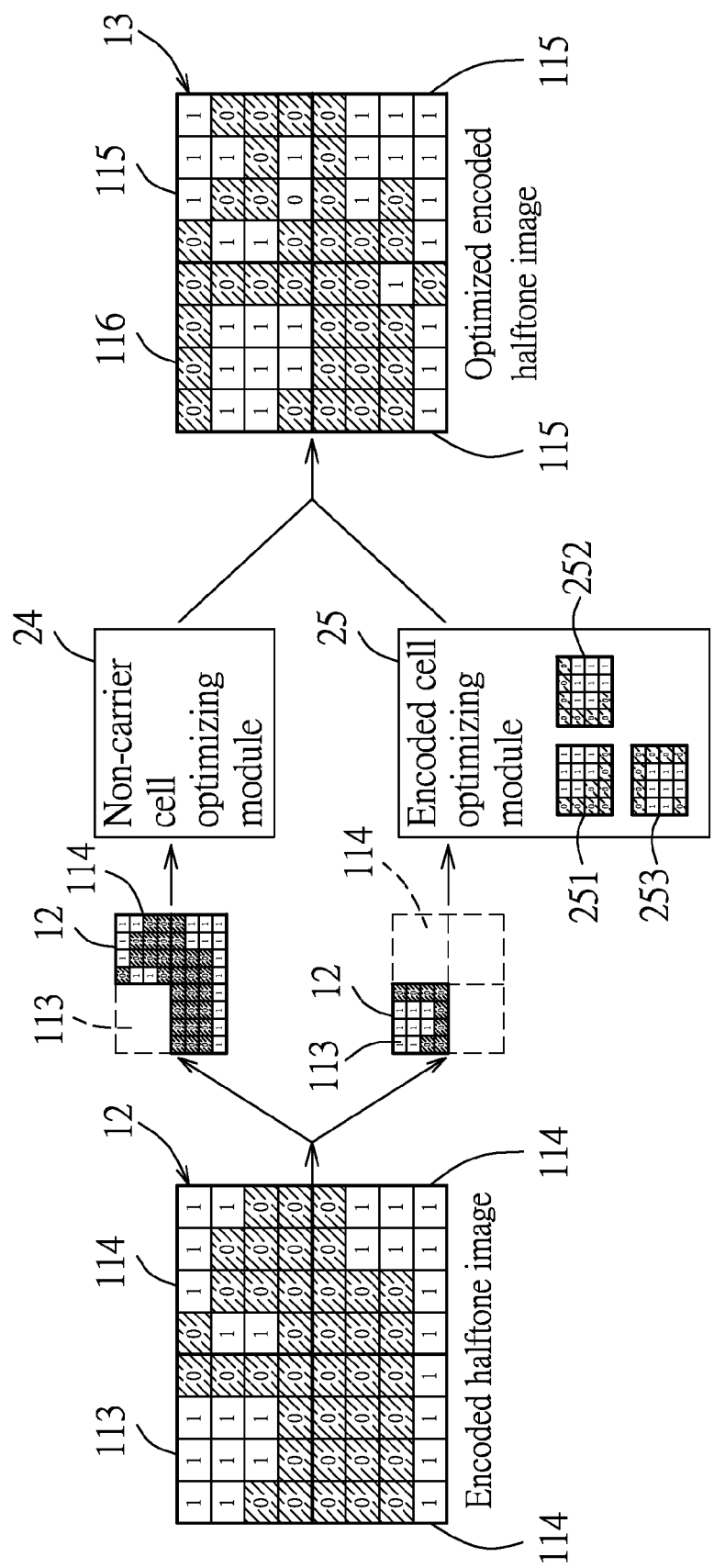
FIG. 6 is a schematic diagram illustrating a process flow of the embodiment of the encoding system to optimize the encoded halftone image by direct binary search.

Referring to FIG. 6, in order to optimize image quality of the encoded halftone image 12 for visually approaching the original grayscale image 10, the non-carrier cell optimizing module 24 of this embodiment optimizes non-carrier cells 114 in the encoded halftone image 12 by performing a direct binary search (DBS) on each pixel for each of the non-carrier cells 114 in the encoded halftone image 12, where the non-carrier cells 114 refer to image cells other than the encoded cell 113, and the DBS is performed on the pixels for each non-carrier cell 114 in an order from left to right and from top to bottom. In detail, for each non-carrier cell 114, the non-carrier cell optimizing module 24 may perform optimization by judging which one of toggling operation or swapping operations with neighboring pixels achieves a minimum error from a corresponding portion of the original grayscale image 10 via a human visual system based model, thereby obtaining an optimized non-carrier cell 115. Optimization of the non-carrier cells 114 may be accomplished by iterative/recursive trials of DBS until the minimum error for each non-carrier cell 114 from a portion of the original grayscale image 10 that corresponds to the non-carrier cell 114 has been determined.

In this embodiment, the non-carrier cell optimizing module 24 performs the DBS for the non-carrier cells 114 one by one in an order from top to bottom and from left to right. In other words, the non-carrier cell optimizing module 24 performs the DBS on only one non-carrier cell 114 at one time, and performs the DBS on a next non-carrier cell 114 only when the minimum error for the current non-carrier cell 114 has been determined, thereby reducing a number of iterative/recursive trials and promoting speed of image processing.

Similarly, in order to optimize image quality of the encoded halftone image 12 for visually approaching the original grayscale image 10, the encoded cell optimizing module 25 of this embodiment performs a modified DBS on each encoded cell 113 of the encoded halftone image 12. The modified DBS differs from the abovementioned DBS in that the encoded cell optimizing module 25 only performs trails of all possible displacements of the first-tone pattern of the dot pattern in the encoded cell 113. As an example, in FIG. 6, the first-tone pattern associated with the encoded cell 113 has only three possible displacement patterns as shown in dot patterns 251, 252, 253. The encoded cell optimizing module 25 may optimize the encoded cell 113 by judging which displacement pattern results in the minimum error from a corresponding portion of the original grayscale image 10 via the human visual system based model, thereby obtaining an optimized encoded cell 116. In FIG. 6, the encoded cell 113 is optimized using the dot pattern 253. Optimization of all encoded cell(s) 113 may be accomplished by iterative/recursive trials of finding the minimum error for each encoded cell 113.

Finally, the non-carrier cell optimizing module 24 or the encoded cell optimizing module 25 combines the optimized non-carrier cells 115 and the optimized encoded cell 116 to form an optimized encoded halftone image 13 (i.e., the data-bearing halftone image).

By virtue of the abovementioned algorithm, a to-be-encoded image may be converted into a data-bearing halftone image for output by printing or displaying, thereby facilitating applications in various industries that require data to be embedded into specific patterns or trademarks, and each carrier cell 112 of the original halftone image 11 may bear two bits or at least one bit of binary data. In addition, with such an encoding algorithm which encodes with rotationally asymmetric first-tone patterns, encoding may be applicable even in the halftones (at gray-levels close to 50% area coverage) by use of, for example, the $8^{th}$ reference dot pattern that has half of black dots and half of white dots.

Figure 7:
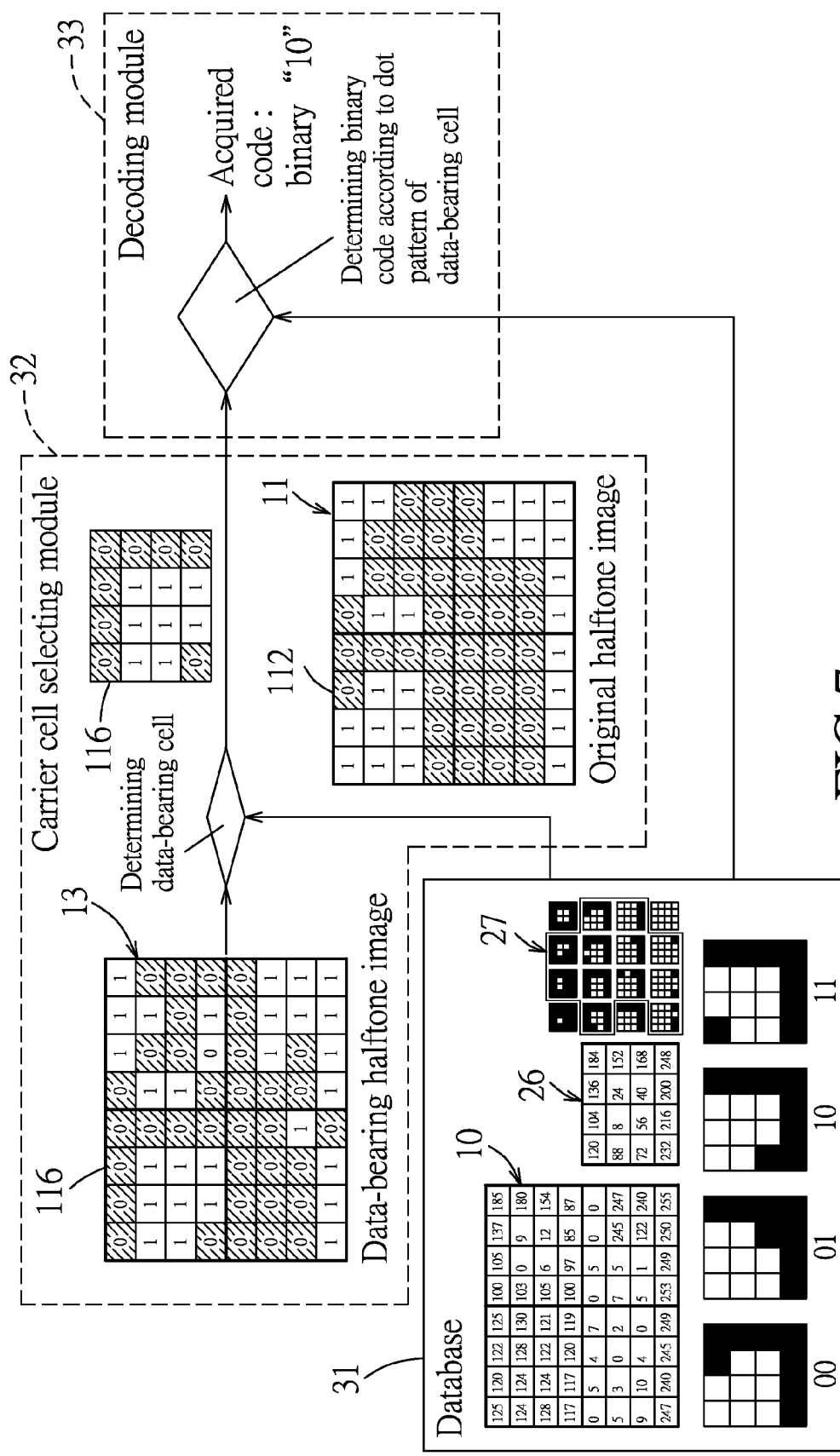
FIG. 7 is a schematic diagram illustrating functional blocks of an embodiment of the decoding system according to the present disclosure and a process flow to decode a data-bearing halftone image.
Figure 8:
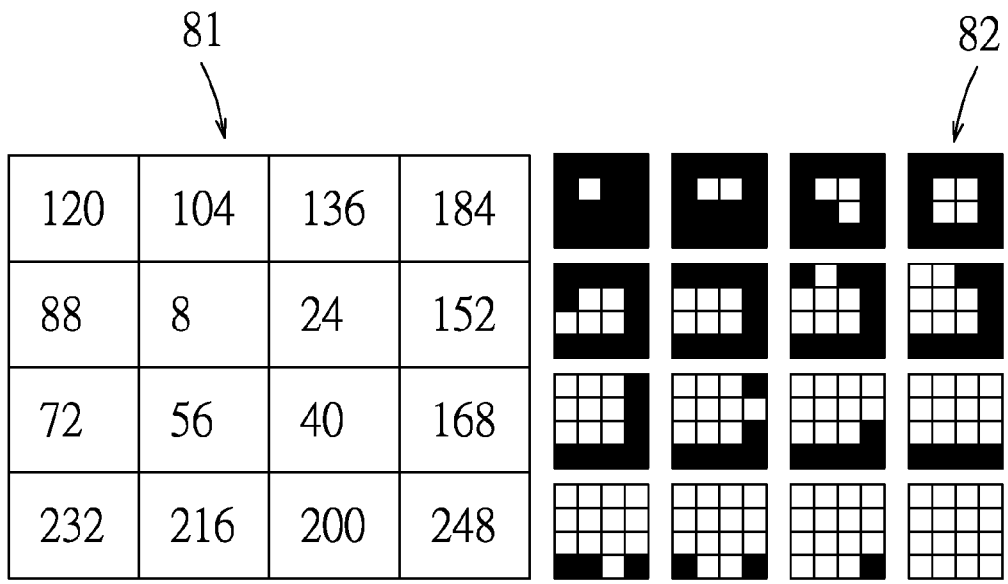
FIG. 8 is a schematic diagram exemplarily showing a clustered-dot threshold matrix and a corresponding dot growth order.
Figure 9:
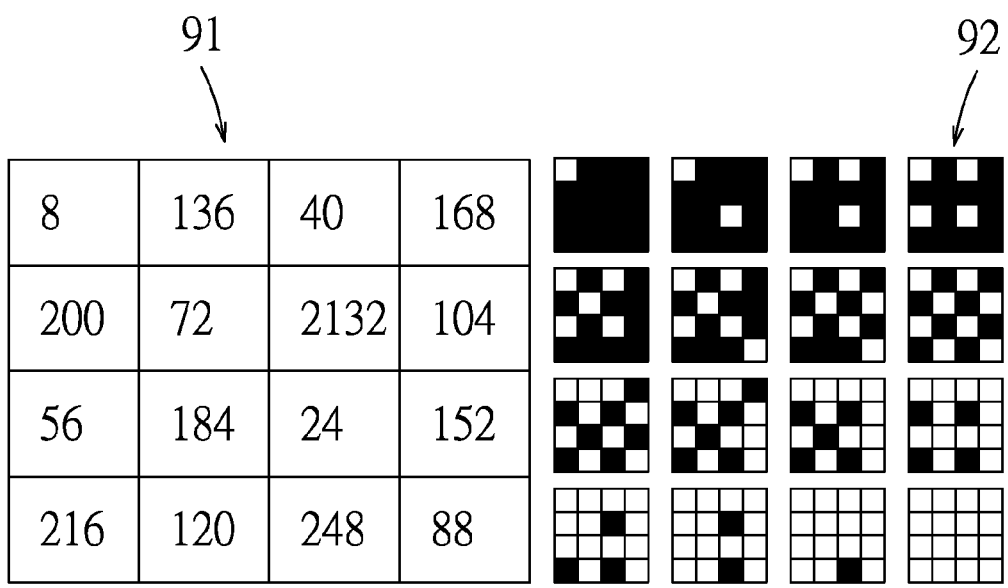
FIG. 9 is a schematic diagram exemplarily showing a dispersed-dot threshold matrix and a corresponding dot growth order.

When a picture, a pattern or a trademark is presented using a halftone image encoded using the abovementioned algorithm, a corresponding decoding system may be used to read the data/information embedded therein for subsequent verification or application. Referring to FIG. 7, an embodiment of the decoding system according to this disclosure is provided for reading data embedded in a data-bearing halftone image, and includes a database 31, a carrier cell selecting module 32 and a decoding module 33. In this example, the data-bearing halftone image is a portion of a to-be-decoded image (not shown), and is exemplified using the aforementioned optimized encoded halftone image 13. The database 31 stores the original grayscale image 10 corresponding to the data-bearing halftone image 13, the square threshold matrix 26 and the dot growth order 27 corresponding to the square threshold matrix 26. In this embodiment, the database 31 further stores the rotation patterns that are defined to represent different binary codes for each reference dot pattern having the asymmetric first-tone pattern. As an example, FIG. 7 shows four rotation patterns corresponding to the $8^{th}$ reference dot pattern.

As shown in FIG. 7, in this embodiment, the carrier cell selecting module 32 converts the original grayscale image 10 stored therein into a halftone image having multiple image cells according to the square threshold matrix 26 upon receipt of the data-bearing halftone image 13. In other embodiments, should the database 31 store therein multiple original grayscale images, an input may be provided to indicate which original grayscale image is to be converted into the halftone image using the same threshold matrix as that being used to generate the data-bearing halftone image upon receipt of the data-bearing halftone image 13 for performing subsequent decoding of the data-bearing halftone image 13.

Then, the carrier cell selecting module 32 selects a carrier cell 112 from the image cells 111 in the same manner as described in the encoding method above, and determines a data-bearing cell from the data-bearing halftone image 13 (i.e., the aforementioned optimized encoded cell 116 of the data-bearing halftone image 13) that corresponds in location to the carrier cell 112 in the halftone image generated by the carrier cell selecting module 32. The decoding module 33 determines one of the rotation patterns that has a first-tone pattern identical to the first-tone pattern of the data-bearing cell 116, and determines and outputs a code, e.g., binary "10" in this embodiment, represented by said one of the rotation patterns. Accordingly, data or information embedded in the to-be-decoded image may be read out.

In summary, the embodiment uses a predetermined square threshold matrix 26 to convert an original grayscale image 10 into an original halftone image 11, selects at least one carrier cell 112 from the original halftone image 11 according to the reference dot patterns having the asymmetric first-tone patterns, converts each carrier cell 112 into a corresponding encoded cell 113 by processing the carrier cell 112 according to a rotational state of the first-tone pattern of the carrier cell 112 that represents a to-be-embedded code, and optimizes image quality of the encoded halftone image 12 by modifying the encoded cell 113 and non-carrier cells 114 based upon the direct binary search technique, thereby obtaining an optimized encoded halftone image 13 which visually approaches the original grayscale image 10.

While the disclosure has been described in connection with what is(are) considered the exemplary embodiment(s), it is understood that this disclosure is not limited to the disclosed embodiments but is intended to cover various arrangements included within the spirit and scope of the broadest interpretation so as to encompass all such modifications and equivalent arrangements.

What is claimed is:

1. A method for generating a data-bearing image from an original grayscale image, said method comprising the steps of:

converting the original grayscale image into an original halftone image by screening the original grayscale image using a predetermined threshold matrix that includes a plurality of grayscale threshold values, the original halftone image consisting of first-tone dots and second-tone dots and having a plurality of image cells each corresponding to the predetermined threshold matrix in size;

selecting at least one of the image cells to be a carrier cell according to a set of reference dot patterns that corresponds with the predetermined threshold matrix, the carrier cell having a dot pattern identical to one of the reference dot patterns that has an asymmetric first-tone pattern consisting of a plurality of first-tone dots and being rotationally asymmetric;

converting the carrier cell into an encoded cell according to a to-be-embedded code and at least two different rotational states of the asymmetric first-tone pattern that are respectively defined to represent different codes;

optimizing at least one non-carrier cell which is one of the image cells not determined to be the carrier cell by performing a direct binary search on each pixel of said at least one non-carrier cell until a minimum error from a portion of the grayscale image that corresponds to said at least one non-carrier cell has been determined; and optimizing the encoded cell by performing trials of a variety of displacements in a manner of the direct binary search on a first-tone pattern of the encoded cell that consists of a plurality of first-tone dots until a minimum error from a portion of the grayscale image that corresponds to the encoded cell has been determined.

2. The method according to claim 1, wherein a number of the reference dot patterns is the same as a number of the grayscale threshold values of the predetermined threshold matrix, and the reference dot patterns have different numbers of first-tone dots, the number of the first-tone dots of each of the reference dot patterns being not greater than the number of the grayscale threshold values.

3. The method according to claim 1, wherein the predetermined threshold matrix has a screen tile vector set composed of two two-dimensional vectors [0, N], [N,0], and has N×N grayscale threshold values.

4. The method according to claim 1, wherein the image cells include a plurality of the non-carrier cells, and the step of optimizing at least one non-carrier cell includes performing the direct binary search for only one of the non-carrier cells at one time, and performing the direct binary search for a next one of the non-carrier cells only when optimization for a current one of the non-carrier cells has been accomplished.

5. The method according to claim 4, wherein:
the non-carrier cells and the encoded cells together serve as to-be-optimized cells;
the step of optimizing at least one non-carrier cell and the step of optimizing the encoded cell are iteratively performed for the to-be-optimized cells; and
in each iteration, optimizations for the to-be-optimized cells are performed one by one in an order from left to right and from top to bottom.

6. The method according to claim 5, wherein the optimizations for the to-be-optimized cells are accomplished in a final iteration in which no trial change occurs for each of the to-be-optimized cells.

* * * * *